(12) United States Patent
Bruha et al.

(10) Patent No.: US 7,963,734 B2
(45) Date of Patent: Jun. 21, 2011

(54) BALE HANDLING IMPLEMENT

(76) Inventors: Ernest Robert Bruha, Burwell, NE (US); Greggory Thomas Cooper, Mason City, NE (US)

( * ) Notice: Subject to any disclaimer, the term of this patent is extended or adjusted under 35 U.S.C. 154(b) by 172 days.

(21) Appl. No.: 12/537,846

(22) Filed: Aug. 7, 2009

(65) Prior Publication Data
US 2010/0040436 A1 Feb. 18, 2010

Related U.S. Application Data

(60) Provisional application No. 61/089,047, filed on Aug. 14, 2008.

(51) Int. Cl.
*A01D 87/00* (2006.01)
*A01D 87/12* (2006.01)
*B66F 9/065* (2006.01)
*B60P 1/44* (2006.01)

(52) U.S. Cl. ....... 414/24.5; 414/703; 414/666; 414/541; 414/721

(58) Field of Classification Search ............... 280/416.2; 414/111, 24.5, 24.6, 389, 471, 411, 541, 414/552, 555, 622, 666, 685, 703, 719, 721, 414/722, 739, 742, 911
See application file for complete search history.

(56) References Cited

U.S. PATENT DOCUMENTS

| | | | | |
|---|---|---|---|---|
| 2,727,640 A | * | 12/1955 | McClenny | 414/703 |
| 2,755,944 A | * | 7/1956 | Wetz | 414/685 |
| 2,760,660 A | * | 8/1956 | Garner et al. | 414/685 |
| 2,945,610 A | * | 7/1960 | Wendt | 414/666 |
| 2,954,886 A | * | 10/1960 | Nelson | 414/24.5 |
| 3,072,272 A | * | 1/1963 | Howlett | 414/718 |
| 3,504,810 A | * | 4/1970 | Walda | 414/541 |
| 3,880,305 A | * | 4/1975 | Van Polen | 414/24.5 |
| 3,908,846 A | | 9/1975 | Brummitt | |
| 3,921,987 A | | 11/1975 | Johnston et al. | |
| 3,934,726 A | | 1/1976 | Martin | |
| 3,957,167 A | | 5/1976 | Jacobson et al. | |
| 4,015,739 A | | 4/1977 | Cox | |
| 4,032,184 A | | 6/1977 | Blair | |
| 4,044,963 A | | 8/1977 | Hostetler | |
| 4,084,707 A | | 4/1978 | McFarland | |
| 4,091,947 A | * | 5/1978 | Fischer | 414/703 |
| 4,120,405 A | | 10/1978 | Jones et al. | |
| 4,120,947 A | | 10/1978 | Diamond | |
| 4,306,825 A | * | 12/1981 | Yilit | 414/24.5 |
| 4,537,549 A | | 8/1985 | Knels | |
| 4,648,769 A | | 3/1987 | Stirling | |
| 4,909,694 A | | 3/1990 | Peters et al. | |

(Continued)

FOREIGN PATENT DOCUMENTS
DE 3103653 A1 * 9/1982

(Continued)

*Primary Examiner* — Gregory W Adams
(74) *Attorney, Agent, or Firm* — Marsh Fischmann & Breyfogle LLP

(57) ABSTRACT

A handling apparatus is provided that attaches to a three-point hitch of a farm implement/tractor. The apparatus allows for engaging multiple bales in a field while the tractor is driven in a forward direction. The bales are engaged while they are disposed beside the tractor such that they are in view of the operator. Once bales are engaged, the apparatus allows for rotating the bales from a position beside the tractor to a position behind the tractor. This allows, inter alia, the tractor to pass through openings (e.g., gates or doors) while carrying multiple bales.

15 Claims, 5 Drawing Sheets

U.S. PATENT DOCUMENTS

| | | |
|---|---|---|
| 5,129,775 A | 7/1992 | Coats et al. |
| 5,165,836 A | 11/1992 | Shonka |
| 5,224,323 A | 7/1993 | Fykse |
| 5,288,193 A | 2/1994 | Warburton et al. |
| 2005/0074311 A1* | 4/2005 | Byrd .......................... 414/24.5 |
| 2006/0245893 A1* | 11/2006 | Schottke ....................... 414/632 |
| 2010/0040436 A1* | 2/2010 | Bruha et al. ................. 414/24.5 |

FOREIGN PATENT DOCUMENTS

DE 3621243 A1 * 1/1988

* cited by examiner

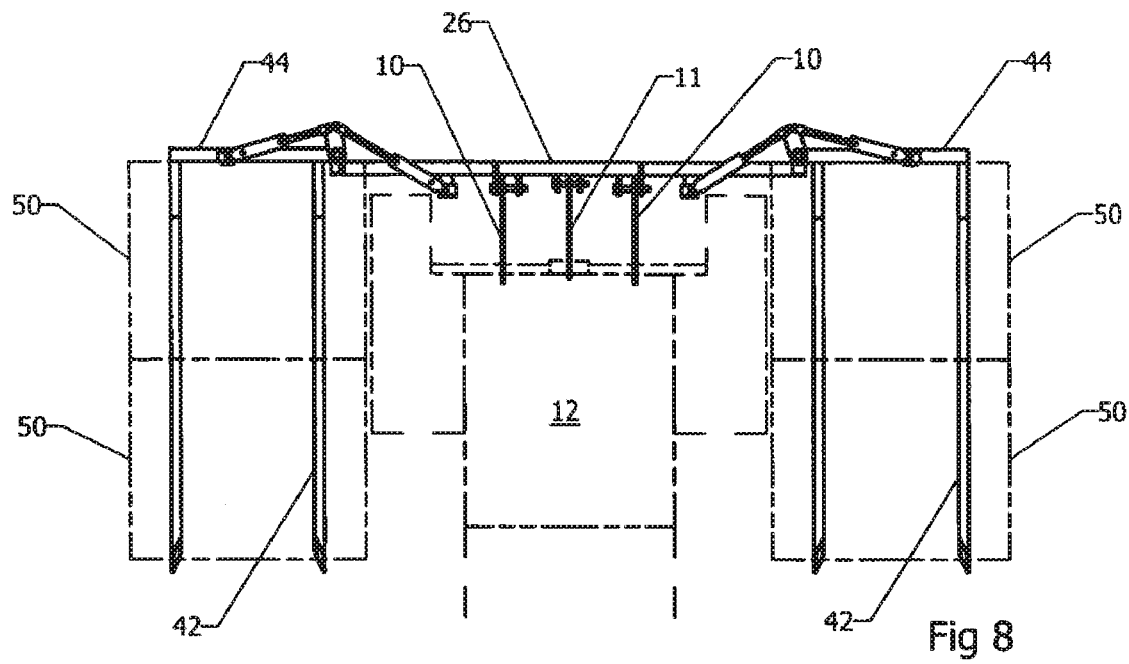
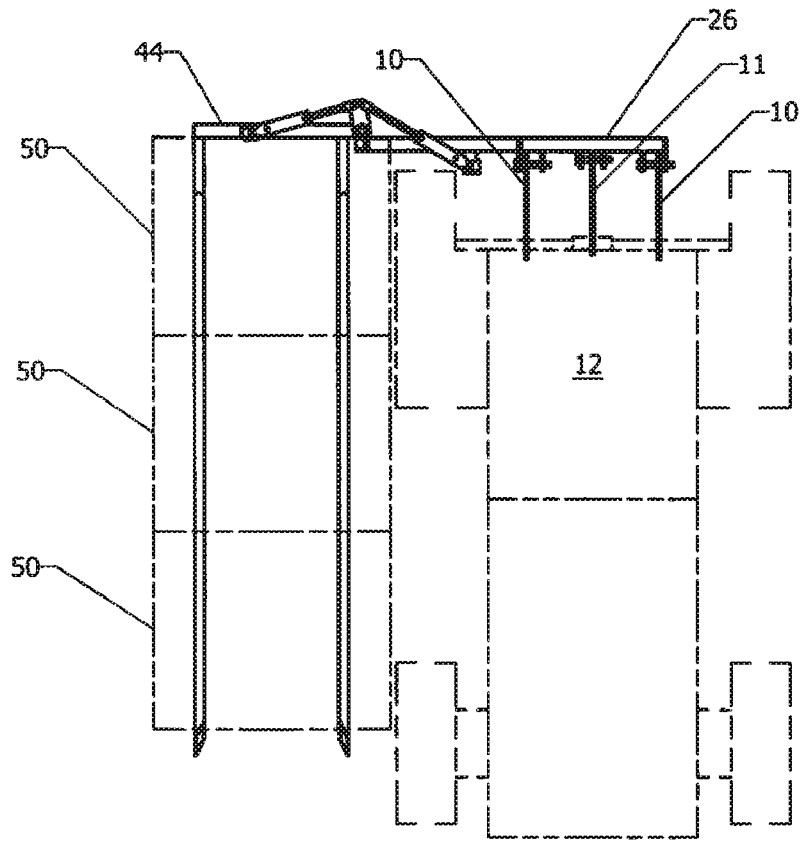

BALE HANDLING IMPLEMENT

CROSS REFERENCE TO RELATED APPLICATION

This application claims the benefit of the filing date of U.S. Provisional Application No. 61/089,047 entitled: "Round Bale Handling Apparatus" and having a filing date of Aug. 14, 2008.

FIELD

Disclosed herein is an apparatus for handling hay bales or other crop bales. Certain embodiments of the apparatus are particularly well suited for handling round bales.

BACKGROUND

A number of crops, and in particular hay, are often cut in the field where they are grown and allowed to cure/dry. After curing, the hay is compressed in to bales by a mechanized baler. Mobile balers, were first developed around 1940 and produced rectangular bales small enough for a person to lift, usually between 70 and 100 pounds each. The size and shape made it possible for people to pick bales up, stack them on a vehicle for transport to a storage area, then build a haystack by hand.

The handling of bales of hay has always been difficult, heavy and tiring work. However, the introduction of large round and square bales, which can weigh 700-900 lbs and 1800-2000 lbs, respectively, has made it impossible to manually lift and handle individual bales. As a result, there have been many devices proposed for handling such bales either from a front loader or from a three-point hitch arrangement of a motorized farm implement (e.g., tractor). These prior art loaders are generally of three types. One type has a pair of arms with transverse pins at one end adapted to engage a single bale, generally at its axis, on opposite sides. Another type of apparatus uses a spear type lift arrangement. These prior art loaders are typically limited to engaging a single bale. Another type utilizes a multiple cradle arrangement where an implement connected to a tractor utilizes spaced tines that are lowered to the ground to engage a bale. Most of these cradle type loaders require that an operator perform multiple direction changes in a tractor to load the multiple cradles. Further, if one or more these cradles extend beyond the width of the tractor, it is often impossible to transport the bales though gates and/or into buildings. This typically requires unloading the bales and utilizing another implement to effect the final storage of the bales.

SUMMARY

Provided herein is a system and method (i.e., utility) that allows for handling a plurality of hay or other crop bales utilizing a prime mover, such as a tractor, while significantly reducing the directional changes required by the tractor. This that allows the operator to focus observation primarily in the forward direction as well as reducing the amount of time required to remove bales from a field. In various arrangements, the utility allows for handling a plurality of bales where the bales may be loaded independently of one another and then discharging together. The utility is adapted for interconnection to a three-point hitch system of a tractor. Such a three-point hitch system may allow for raising and/or tilting the apparatus. Furthermore, the power systems of the tractor (e.g., hydraulic and/or power take-off (PTO)) may be utilized to operate the apparatus.

According to a first aspect, a bale handling apparatus is provided. The apparatus includes an elongated frame having a mid-portion that is adapted for connection to a three-point hitch of a tractor. When connected to the tractor, the elongated frame extends transverse to a forward direction of travel of the tractor and defines a horizontal reference axis. First and second bale engagement assemblies are attached to first and second ends of the elongated frame. Each of these bale engagement assemblies has at least one tine that is adapted to engage a bale. Such tines may pierce or cradle the bales. Further, an actuator, which is connectable to a power source of a tractor, is adapted to rotate at least one of the bale engagement assemblies between a first extended position and a second retracted position.

In the first extended position, the bale engagement assembly or assemblies extend to a side of the tractor beyond the outside edge of the rear wheel of the tractor. In this extended position the assembly may be utilized to engage a bale while the tractor is driven in a forward direction. In the second retracted position, the assembly or assemblies are positioned substantially behind the rear wheels of the tractor. In this regard, after engaging a bale with the bale engagement assembly, it may be moved from a position to the side of the tractor to a position behind the tractor. This allows, inter alia, the tractor to pass through openings (e.g., gates or doors) while carrying one or more bales. In this regard, it will be appreciated that when the bale engaging assembly/assemblies are in the extended position, the width of the bale handling apparatus is wider than the tractor, and when in the retracted position, the bale handling apparatus has a width that may be approximately equal to the width of the rear wheels of the tractor.

The actuator may be any mechanical, hydraulic, pneumatic and/or electrical system that allows for rotating the bale engagement assemblies between the extended and retracted positions. For instance, gears, chains, linkages and other systems that affect the rotation of the bale engagement assemblies may be utilized. In one particular arrangement, first and/or second hydraulic cylinders are utilized to effect the rotation of the bale engagement assemblies. In such an arrangement, the cylinders may be dual-acting cylinders that allow for pushing and pulling.

In order to attach the bale handling apparatus to a tractor, the apparatus typically includes a hitch frame that is fixedly interconnected to the elongated frame. The hitch frame may have any appropriate geometric shape but generally includes at least one structure that extends vertically above the horizontal axis defined by the elongated frame to provide a connection point for the center link of a three-point hitch. Furthermore, the hitch frame typically includes at least first and second connection points for the lower linkage arms of the three-point hitch assembly.

According to another aspect, a bale handling apparatus is provided for removable mounting to a tractor having one or more pairs of rear wheels and a three-point hitch situated between/behind the rear wheels. The apparatus includes an elongated frame that is adapted to be mounted to a three-point hitch of a tractor such that the frame extends transverse to a forward direction of travel of the tractor when mounted thereto. A first boom is pivotally connected proximate to a first end of the elongated frame. This boom supports one or more tines that are adapted to engage a bale. An actuator is operable to move this boom between a retracted position and an extended position. In the retracted position, the body of the boom is rotated to a position that is substantially adjacent/ juxtaposed relative to the elongated frame. In the extended position, a free end of the boom extends beyond the first end of the elongated frame. That is, in a first position, the boom may be folded against the frame such as disposed substantially behind the rear wheels of the tractor, and in the extended position it may be rotated to a position where the boom extends beyond the outside edge of the rear wheels of the tractor.

In one arrangement, when the boom is extended it extends substantially parallel with the elongated frame. In such an arrangement, the tines may be attached to the boom such that they are transverse to the body of the boom and extend in the forward direction of travel of the tractor when extended. This allows an operator to engage a bale with the forwarded extended tines while traveling in a forward direction. Once engaged, the boom may be moved to the retracted position such that the tines face in the rearward direction of travel behind the tractor.

In a further arrangement, the bale handling apparatus includes a second boom that is pivotally connected to a second end of the elongated frame. Again, this boom is operable to move between a retracted position, juxtaposed adjacent to the frame and an extended position that extends beyond the second end of the frame. Accordingly, the first and second booms may be utilized to engage first and second bales. In one arrangement that utilizes first and second booms, the first and second booms may be separably operable to move from the extended position to the retracted position. In another arrangement, the booms may operate simultaneously such that after first and second bales are loaded, the bales are moved together from their locations to the side of the tractor to a position behind the tractor.

The tines utilized to engage the bale may be any appropriate structure that allows the apparatus to engage a bale and lift it off the ground prior to rotating the bale to the position behind the tractor. Typically, such tines are metal stakes that are greater than two feet in length and have a sharpened point. In various different arrangements, a single tine may be utilized (e.g., to engage a center portion of the bale) or multiple tines may be utilized to cradle the bale. In arrangements that utilize multiple tines, the distance between these tines may be adjustable to allow the apparatus to be utilized with differently sized bales. In a further arrangement, the length of the tines may be such that the tines may engage two or more bales. In arrangements having tines long enough to engage two or more bales, the tips of one or more tines may include a wheel the supports the tips. Such a wheel may swivel to allow the tines to turn with the tractor.

According to another aspect, methods are provided for moving one or more bales from a first location to a second location. The method includes driving a tractor, including a bale handing apparatus interconnected to a three-point hitch thereof, substantially parallel to a first bale. A bale engagement assembly that is disposed outward relative to a first side of the tractor engages the first bale. After engagement, the bale is raised off the ground. Once raised off the ground, the bale is rotated from a position at the side of a tractor to a position substantially behind the tractor. Such rotation typically occurs in a horizontal plane. Once disposed behind the tractor, the tractor may be driven to another location, and the bale may be lowered to the ground. Once supported on the ground, an operator may drive the tractor in a forward direction to disengage the bale from the bale engagement assembly.

The method may further include engaging first and second bales on first and second sides of the tractor and then rotating the bales behind the tractor such that the first and second bales may be disposed substantially side by side relative to one another behind the tractor. Likewise, the bales may be simultaneously disengaged by lowering the bales to the ground and driving forward.

BRIEF DESCRIPTION OF THE DRAWINGS

FIG. 8 illustrates a top view of another embodiment of a bale handling apparatus having elongated tines.

FIG. 9 illustrates a top view of another embodiment of a bale handling apparatus adapted to engage multiple bales on a single side of a tractor.

DESCRIPTION

Figure 1:
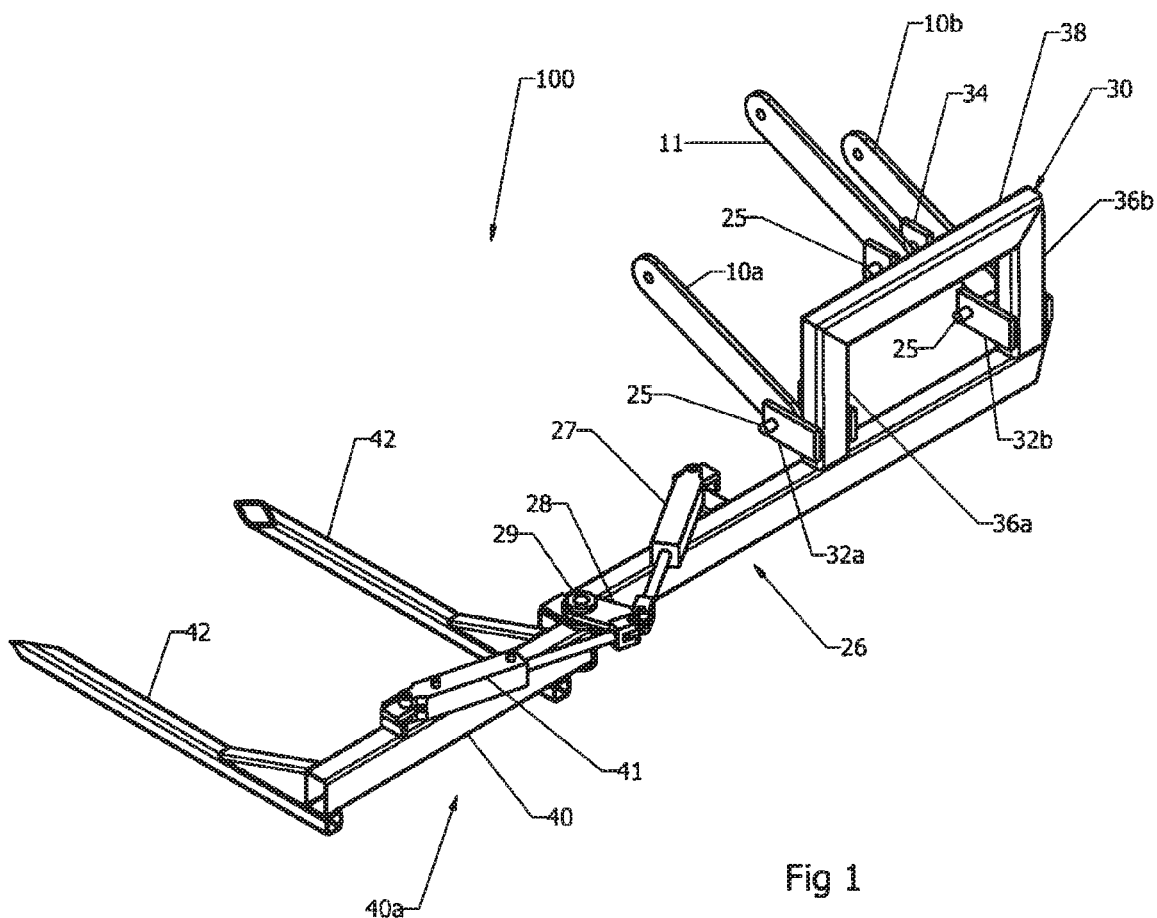
FIG. 1 illustrates a perspective view of one embodiment of a bale handling apparatus in accordance with various aspects of the present disclosure.

Referring to FIGS. 1-5, a bale handling apparatus 100 is shown. The bale handling apparatus 100 allows an operator of a farm implement/tractor to individually engage multiple hay bales, in a field, transport those hay bales to, for example, a storage area and simultaneously discharge the hay bales. The hay bales 50 may be of the round type often utilized in the agriculture industry. Though discussed primarily in relation to round hay bales, it will be appreciated that the bales 50 may be composed of any baled crop, including without limitation, hay, straw and cotton. Furthermore, aspects of the present disclosure may be utilized with bales having configurations other than cylindrical/round such as, for example, large rectangular/square bales.

The bale handling apparatus 100 is adapted to be removably coupled to a tractor 12 of the agriculture type having one or more pairs of rear drive wheels and a three-point hitch situated between the rear wheels. See FIGS. 1-3: The three-point hitch may be of conventional construction including an upper center link 11 and a pair of hydraulically liftable outside lower links/arms 10a, 10b (hereafter 10 unless specifically referenced). The two lower arms—the hitch lifting arms—are controlled by the hydraulic system of the tractor, which provides lifting, lowering, and even tilting to the lower 10 arms. The center arm 11, or center link is allowed to pivot but need not be powered by the tractor's hydraulic system. In another arrangement, the center arm 11 may include hydraulic control to provide additional tilting functionality to the bale handling apparatus 100. Each arm has an attachment device to connect implements to the hitch. Specifically, each arm 10a, 10b, 11 includes one or more apertures for receiving pins 25 to connect an implement such as the bale handling apparatus 100 to the hitch arms.

The hitch lifting arms 10a, 10b are powered by the tractor's hydraulic system, which is controlled by the operator. Usually a variety of settings are available. The three-point hitch system transfers the weight and stress of an implement to the rear wheels of the tractor while providing hydraulic and/or power take off (PTO) power to the implement. The three-point hitch may take any of the various forms manufactured by companies such as, without limitation, Massey Ferguson, Ford, International Harvester, Case, White, John Deere, and Fiat Allis.

In the present embodiment, the bale handling apparatus 100 is formed of an elongated frame 26 that, when connected to the tractor via the three point hitch, is disposed substantially perpendicular to the rearward end of the tractor 12. See FIGS. 2-5. The elongated frame 26 typically extends nearly to and/or beyond one or both of the tractor's outermost rear wheels 14. In order to hold two bales in a side-by-side configuration, as discussed herein, the length of the frame 26 must be at least twice the diameter of the bales the apparatus 100 is designed to engage. However, the exact physical configuration of the frame 26 may be altered. For instance, the cross section of the elongated frame member 26 may form any geometric shape. For example, the elongated frame member 26 may be a tubular or square construction. Further, the elongated frame may be made of multiple members (e.g., parallel tubes etc.).

A hitch frame 30 is fixedly connected near a mid-portion of the elongated frame 26 that provides a structure for interconnecting the apparatus 100 to a three-point hitch. In the present embodiment, the hitch frame 30 includes lower devises 32a, 32b for attachment to the hitch lifting arms 10a, 10b and an upper clevis 34 for attachment to the center linkage 11. As shown, the hitch frame 30 extends vertically above the generally horizontal frame 26 to provide a connection point for the center linkage 11. Though shown as a box frame having a top member 38 extending between first and second side members 36a, 36b, the physical configuration of the hitch frame 30 may be altered in any manner that allows the bale handling apparatus 100 to connect to a three-point hitch. In the present embodiment, lower devises 32a, 32b are affixed to the side members 36a, 36b and each receive a respective one of the links 10a, 10b between first and second spaced plates. Likewise the upper clevis 34 is affixed to the top member 38 and receives the top link 11 between first and second spaced plates. The plates of each of these devises have an aligned aperture that allows pins to extend through the clevis and a link disposed there between.

The opposing first and second ends of the elongated frame 26 moveably support first and second bale engagement assemblies 40a, 40b, respectively (hereafter 40 unless specifically referenced). The first and second bale engagement assemblies 40 are controllably moveable between an extended position (see FIGS. 1, 2, and 4) and a retracted/folded position (see FIGS. 3 and 5). The bale engagement assemblies 40 each include an elongated bar or boom 44 and one or more tines 42. In the present embodiment, the booms 44 are pivotally connected proximate to the ends of the elongated frame 26 via first and second pivot/hinge assemblies 60 that allow the booms 44 to rotate relative to the elongated frame 26. However, it will be appreciated that any coupling that allows the booms 44 to move relative to the elongated frame 26 may be utilized and are considered within the scope of the present disclosure. In the extended position, the support booms 44 are rotated outward and a free end of the boom 44 extends beyond the ends of the elongated frame 26 as well as beyond the outermost wheels of the tractor. In the retracted position, the bale engagement assemblies 40 are folded/rotated to a position that is substantially adjacent to the elongated frame 26. In this regard, in the retracted position, the booms are juxtaposed against the frame 26.

Fixedly connected to each support bar are one or more tines 42 that are adapted to engage a bale 50. The tines 42 are connected to the bale engagement assemblies 40 such that when the booms 44 are extended, the tines project toward the front of the tractor. See FIGS. 2 and 4. In this regard, the tines 42 are operative to engage a bale 50 resting on the ground as the tractor is operated in a forward direction. As shown, first and second tines 42 may be positioned such that these tines 42 slide substantially underneath a bale 50 as it rests on the ground, thus cradling the bale 50. Alternatively, the bale engagement assembly 40 may include one or more tines arranged to pierce the bale 50 (e.g., near a center portion of the bale) as it rests on the ground. In a further alternate embodiment, the tines 42 may be arrangement to both pierce and cradle the bale 50. The tines 42 may be of any length. In the present embodiment the length of the tines is just shorter than the bale 50 to be engaged.

As noted, the forward projecting tines 42 of the bale engagement assemblies 40a and 40b allow engaging and bales 50 while driving the tractor 12 in a forward direction. More specifically, the forward extending tines 42 contact a bale 50 while the bale is situated to the side of the tractor 12 and in clear view of the operator. See for example FIG. 2. This facilitates the engagement of the bales with the apparatus 100. In operation, in order to pick up one bale 50, the tractor 12 with the bale handling apparatus 100 having the booms 44 extended and tines 42 pointing forward and generally parallel to the ground and the axis of the bale proceeds forward. This forces the tines 42 under and/or into the bale until the bale contacts the body of the boom 44. Energizing the three-point hitch lifts the elongated frame 26, which raises the boom 44, tines 42 and supported bale 50. In order to pick up a second bale, the tractor proceeds to the next bale and then lowers the three-point hitch and either tilts the hitch to prevent loaded bale from contacting the ground, if the tractor is so equipped, or lowers the entire frame 26 and pushes the loaded first bale with extended boom 44 until the second bale is loaded on the second boom. Again, energizing the three-point hitch lifts the bales.

After engaging bales on both sides of the tractor 12 and lifting the bales 50 off the ground, a user actuates a mechanism that rotates the first and second bale engagement assemblies 40a, 40b (i.e., and their supported bales) from their extended positions on either side of the tractor to a position substantially behind the tractor 12. See FIGS. 3 and 5: Movement of the bales from positions to each side the of the tractor to a position behind the tractor helps centralize the mass of the bales. The tractor 12 is then driven to a new location whereupon the bales 50 are lowered to the ground. The tractor 12 may then drive forward, disengaging the bales 50 from the bale handling apparatus.

When the one or more bale engagement assemblies 40 are in the retracted position behind the tractor, the tractor 12 and the bale handling apparatus may pass through openings, such as gates or doors, which the tractor 12 and bale handling apparatus may not be able to when the one or more bale engagement assemblies 40 are in the extended position. Stated otherwise, in the retracted position the width of the bale handling apparatus 100 is less than the width of the bale handling apparatus when one or both of the bale engagement assemblies are extended. As will be appreciated, it may be desirable for the tractor 12 and bale handling apparatus 100 to enter a building in which bales 50 are to be stored. In this manner, the bales 50 may not need to be disengaged from the bale handling apparatus and moved the additional distance between the building entry and the interior of the building by other means. Thus, by minimizing the width of the bale handling apparatus and allowing it to enter the building, time and effort are saved. Similarly, the reduced width of the bale handling apparatus may be sufficient to allow it to pass through a gate or fence opening. Further, the ability to engage multiple bales reduces the time and number of trips that must be made to clear bales from a field. This saves man hours, equipment hours and fuel.

Figure 2:
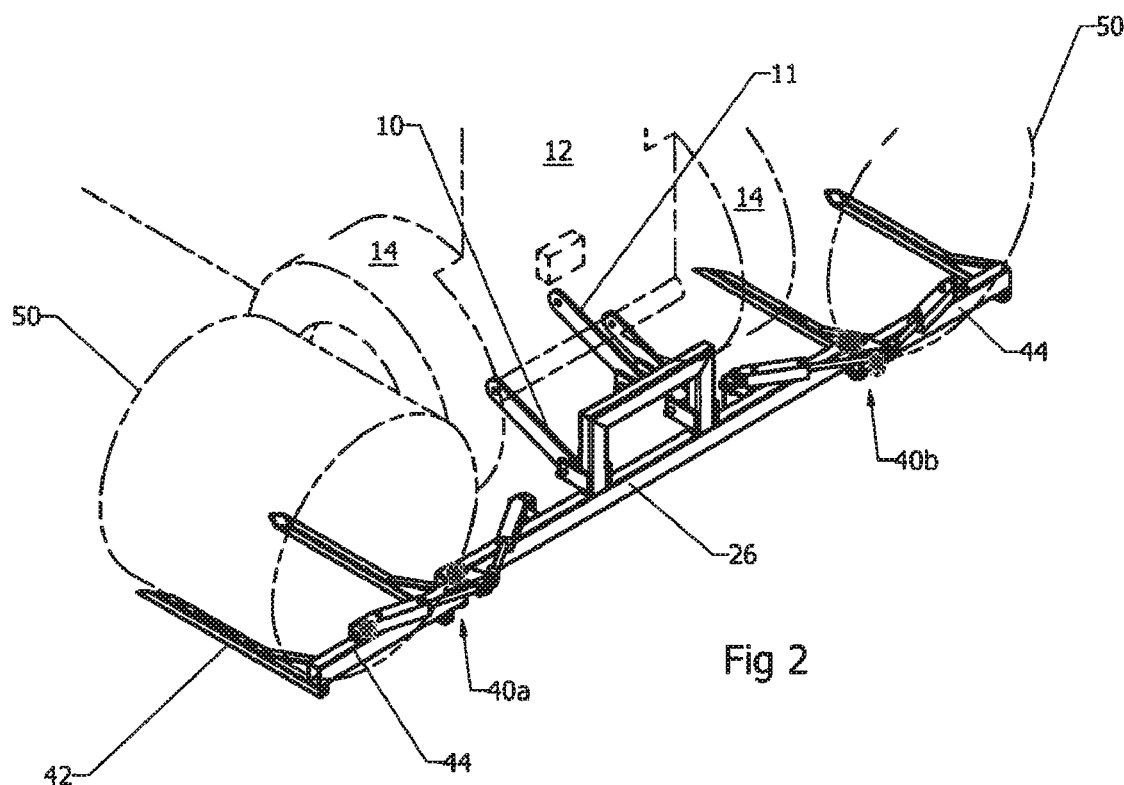
FIG. 2 illustrates a perspective view of one embodiment of a bale handling apparatus having first and second bale engagement assemblies in an extended position.
Figure 3:
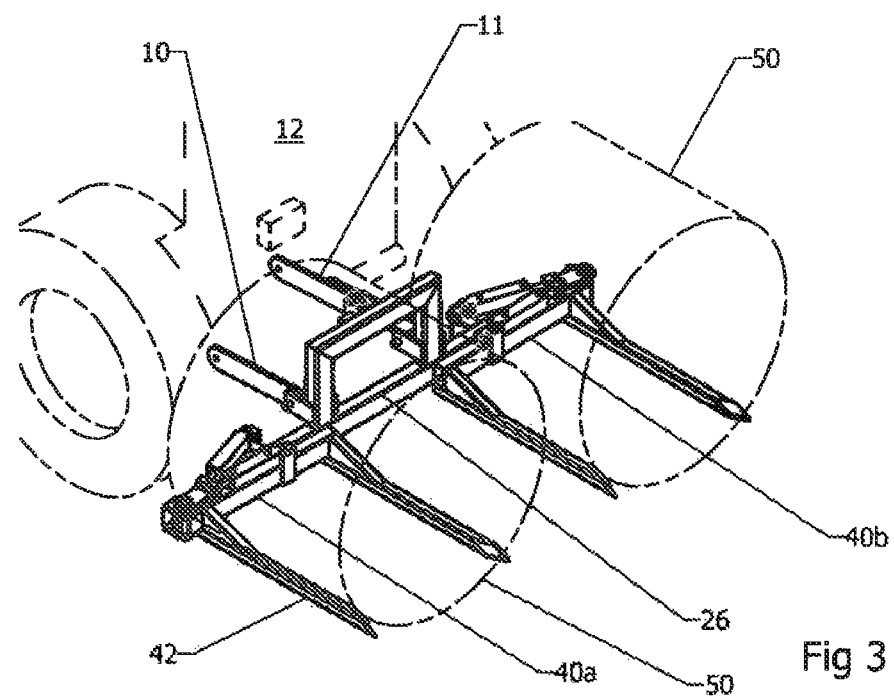
FIG. 3 illustrates a perspective view of one embodiment of a bale handling apparatus having first and second bale engagement assemblies in a retracted position.
Figure 4:
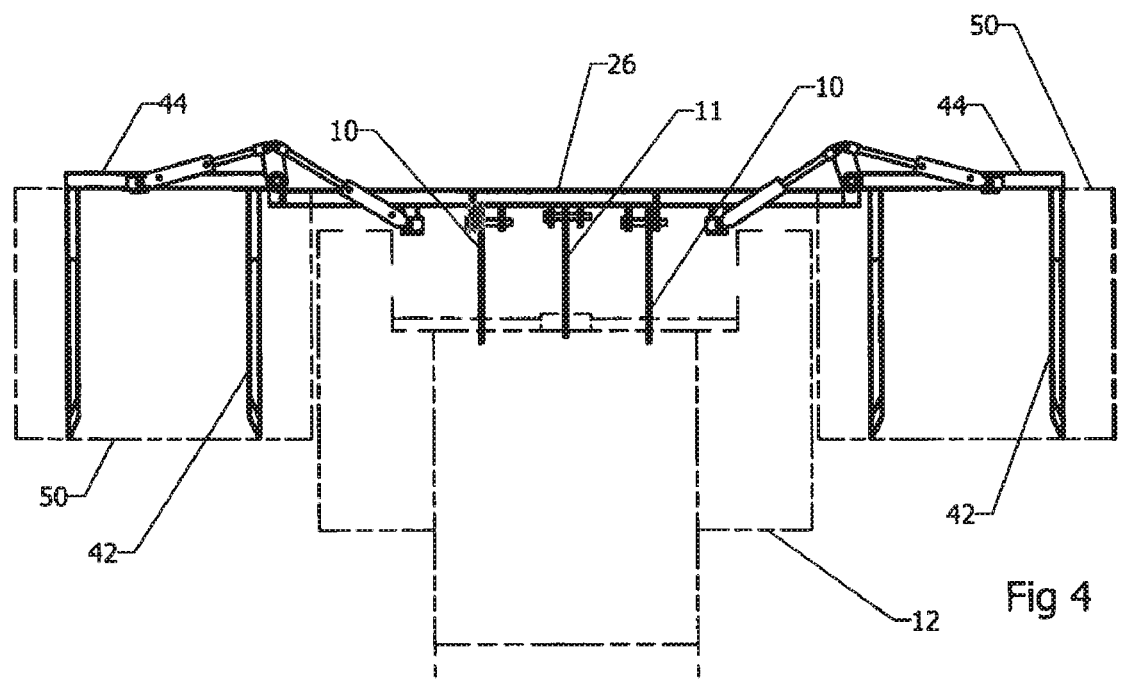
FIG. 4 illustrates a top view of one embodiment of a bale handling apparatus having first and second bale engagement assemblies in an extended position.
Figure 5:
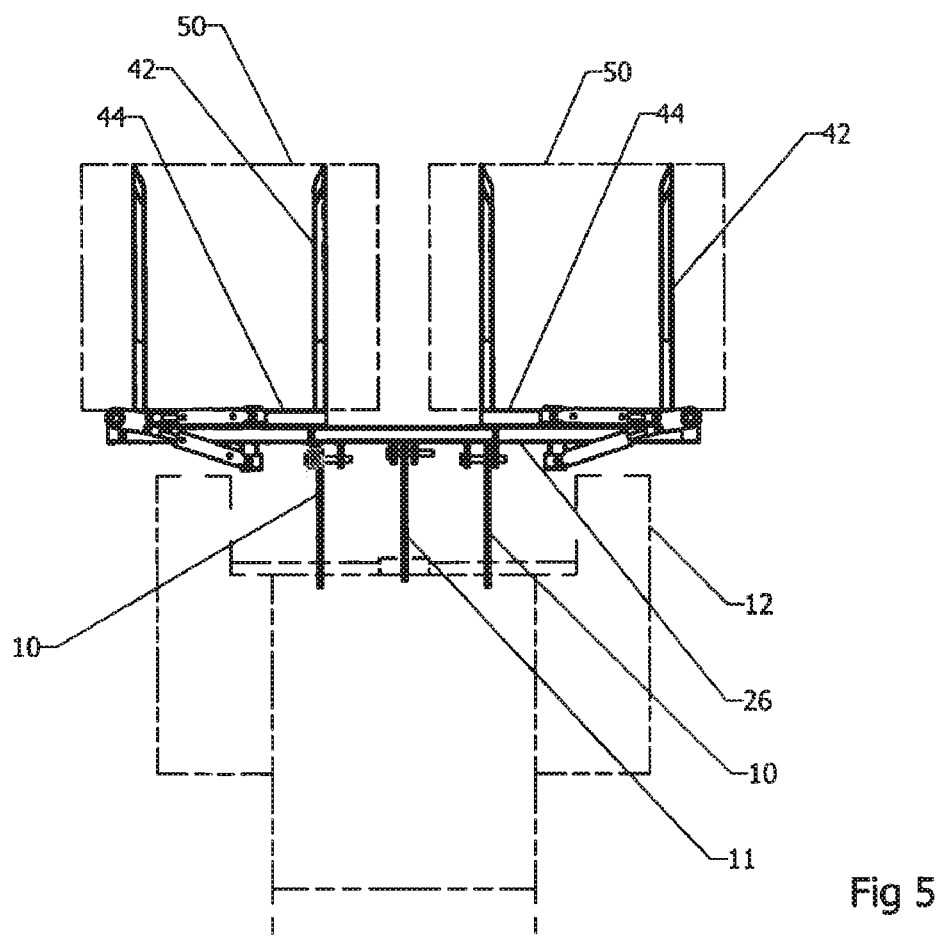
FIG. 5 illustrates a top view of one embodiment of a bale handling apparatus having first and second bale engagement assemblies in a retracted position.

The mechanism for moving the bale engagement assemblies 40a and 40b between a first extended position, as shown in FIGS. 2 and 4, and a second retracted position, as shown in FIGS. 3 and 5, may take many forms. Further, different embodiments may allow the two bale engagement assemblies 40a and 40b to move between the extended position and the retracted position in unison or independently. This mechanism may be any one of, or any combination of, hydraulic actuators, mechanical actuators, electrical actuators, and/or pneumatic actuators. In the present embodiment, the mechanisms for moving the bale engagement assembly 40 between the extended and retracted positions, each includes a first hydraulic cylinder 41 and a second hydraulic cylinder 27 that rotate the boom via a transfer arm 28.

Figure 6:
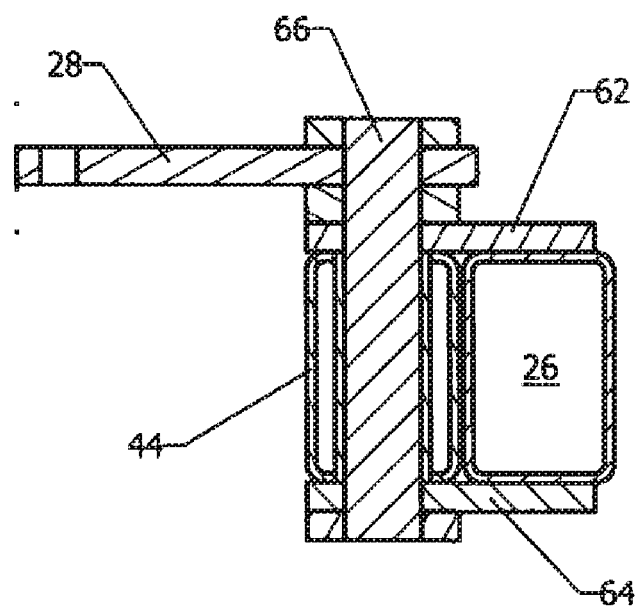
FIG. 6 illustrates a cross-sectional view of one embodiment of an assembly for movably coupling a bale engagement assembly to a frame of the bale handling apparatus.
Figure 7:
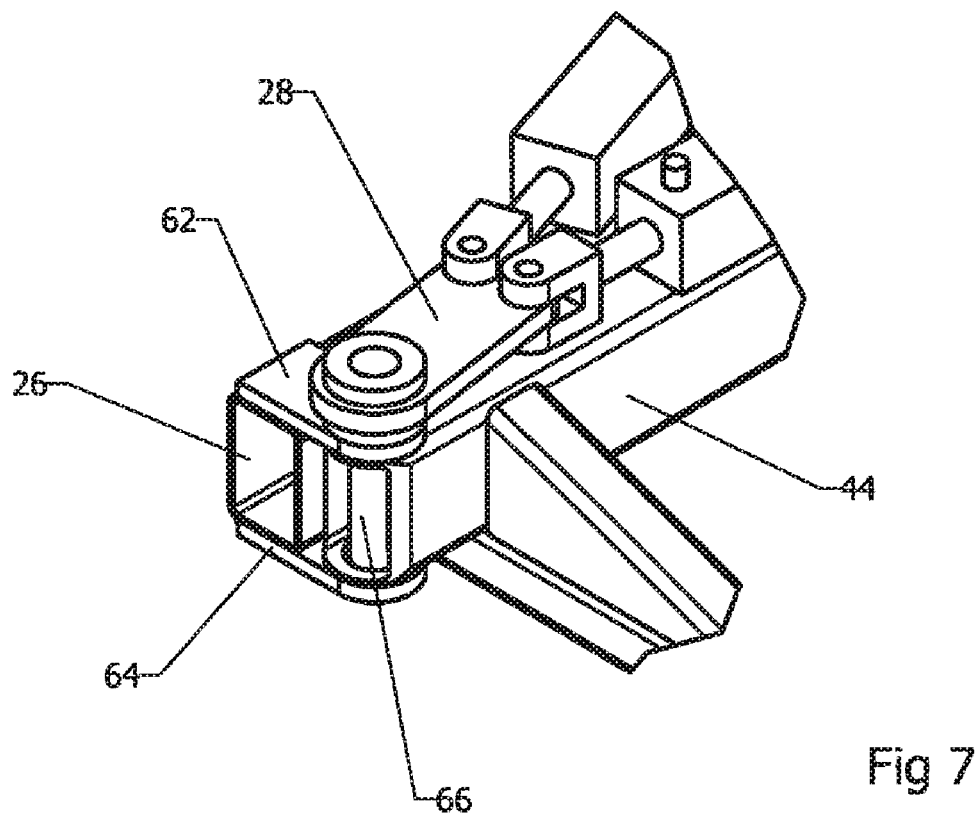
FIG. 7 illustrates a perspective view of one embodiment of an assembly for movably coupling a bale engagement assembly to a frame of the bale handling apparatus.

As shown in FIGS. 1, 6 and 7, the hinge assembly 60 interconnects the boom 44 of the bale engagement assembly 40 to the end of the frame member 26. Generally, the pin assembly 60 includes a clevis arrangement having an upper plate 62 and a lower plate 64 that are spaced to receive the bar 44 there between. Accordingly, a pin 66 extends through this clevis to maintain the boom 40 therein. The clevis defined by the upper and lower plates 62, 64 of the hinge assembly 60 extends rearward from the frame 26. In this regard, when the end of the boom 44 is disposed within the clevis, it is disposed behind the frame 26. This offset between the frame 26 and the boom 44 allows the boom 44 to be rotated substantially against/adjacent to the rearward face of the frame 26 when the bale engagement assembly 40 is disposed in the retracted position as illustrated in FIGS. 3, 5 and 7. Typically, the spacing of the offset allows the boom to move at least 180 degrees from a position where the boom is disposed against the frame 26 to a position where the boom 44 extends substantially straight out from the frame 26.

In the present arrangement, the pin 66 extending through the top and bottom plates 62, 64 is fixedly interconnected to the boom 44 of the bale engagement assembly 40. A transfer arm 28 is connected to the top of the pin 66 at a location above the upper plate 62. As shown, the transfer arm 28 extends from the pin 66 rearward forming a lever arm. Pivotally interconnected to distal end of this lever arm are the driven ends of first and second hydraulic cylinders 41 and 27. As shown, the first hydraulic cylinder has a second end that is connected to the frame 26 via a bracket. The second end of the second cylinder 41 is connected to the boom 40. These second ends are each attached to their brackets via a pin that allows the cylinders to move relative to the bracket. In this regard, it is noted that the bodies of the cylinders 27, 41 move as the boom is rotated.

When these hydraulic cylinders 27, 41 are actuated from an extended mode to a retracted mode, the boom 40 of the bale engagement assembly 40 rotates from the extended position to the retracted position. When the hydraulic cylinders 27, 41 are actuated from a retracted mode to an extended mode, boom 44 of the bale engagement assembly 40 rotates from the retracted position to the extended position. The first hydraulic cylinder 41 and the second hydraulic cylinder 27 may be driven from the hydraulic system of the tractor 12 and are controlled by the tractor operator. In the present arrangement, the assemblies 40a, 40b are commonly activated. However, it will be appreciated that in other arrangements these assembles may be independently operable.

FIG. 8 illustrates another embodiment of a bale handling apparatus that again utilizes first and second bale engagement assemblies that are pivotal between a retracted position and an extended position. Likewise each assembly includes a boom 44 with tines 42 that extend forward when the bale engagement assemblies are in an extended position. Structurally, the apparatus of FIG. 8 is substantially similar to the embodiment discussed above in relation to FIGS. 1-7 except that the tines 42 are longer. As shown, each pair of tines 42 has a length that allows for engaging first and second bales 50. This allows for engaging four bales 50 utilizing the bale handling apparatus 100. Again, once the bales 50 are engaged they may be rotated from a position beside the tractor 12 to position substantially behind the tractor. As will be appreciated, the ability to engage more bales yet further reduces the time needed to clear a field of bales.

FIG. 9 illustrates another embodiment of a bale handling apparatus. In this particular embodiment, the bale handling apparatus utilizes a single bale handling assembly. The boom 44 of the assembly includes two tines having a length that allows for engaging three bales. In such an arrangement, it may be desirable that the tips of one or both tines include assembly swivel wheel (not shown) that provides support to the tip of the tine. Such a wheel is preferably small enough that the top of the wheel does not hinder the movement of the tine under a bale.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, within the scope of the present invention. For instance, the bale handling apparatus may be made of various material or combination of materials of sufficient rigidity to support the weight of one or more bales. Such materials include, but are not limited to, steel, aluminum, and composite metal. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A bale handling apparatus adapted for removable mounting on a tractor having one or more pairs of rear wheels and a three-point hitch situated between the rear wheels, comprising:

an elongated frame having a mid portion adapted for connection to a three point hitch of a tractor, where the elongated frame extends transverse to a forward direction of travel of said tractor and defines a horizontal reference axis;

first and second bale engagement assemblies movably attached to first and second ends of the elongated frame member, wherein each bale engagement assembly comprises an elongated bar pivotally attached to said elongated frame, wherein each said elongated bar supports said at least one tine for engaging a bale;

an actuator, connectable to a power source of said tractor, adapted to move at least one of the bale engagement assemblies between a first extended position and a second retracted position, wherein the first extended position extends to a side of said tractor, and the second retracted position is substantially behind said tractor and wherein each said tine is connected its respective elongate bar such that the tine is substantially aligned with the forward direction of travel when the elongated bar is in the first extended position.

2. The bale handling apparatus as set forth in claim 1, further comprising:
   a hitch frame fixedly connected to the elongated frame, wherein the hitch frame is includes connection points for attaching the bale handling apparatus to said three-point hitch, wherein the hitch frame includes at least one vertical structure that extends vertically above the elongated frame.

3. The bale handling apparatus as set forth in claim 1, wherein one of said first and second bale engagement assemblies is pivotally attached proximate to a first end of the elongated frame such that when the bale engagement assembly is in the first extended position the width of the bale handling apparatus is greater than the width of the bale handling apparatus when the bale engagement assembly is in the second retracted position.

4. The bale handling apparatus as set forth in claim 1, wherein the actuator for moving the bale engagement assembly between the first position and the second position comprises one of a hydraulic actuator and a mechanical actuator.

5. The bale handling apparatus as set forth in claim 1, wherein the actuator for moving the bale engagement assemblies between the first extended position and the second retracted position comprises at least a first hydraulic cylinder.

6. The bale handling apparatus as set forth in claim 5, wherein the actuator comprises first and second hydraulic cylinders.

7. A bale handling apparatus adapted for removable mounting to a tractor having one or more pairs of rear wheels and a three-point hitch situated between the rear wheels, comprising:
   an elongated frame adapted to be mounted to a three point hitch of a tractor, wherein the elongated frame extends transverse to a forward direction of travel of such a tractor when mounted thereto;
   a first boom having free end and another end pivotally connected proximate to a first end the elongated frame;
   at least one tine connected to the first boom and extending transverse to a body of the first boom; and
   a first actuator operable to move the first boom between a retracted position, wherein the body and the free end of the first boom are juxtaposed relative to the elongated frame, and an extended position wherein the free end of the first boom extends beyond the first end of the frame, wherein in the retracted position the tine is substantially aligned with a rearward direction of travel and wherein in the extended position the tine is substantially aligned with the forward direction of travel.

8. The bale handling apparatus as set forth in claim 7, wherein when the first boom is in the extended position the width of the bale handling apparatus is greater than the width of the bale handling apparatus when the first boom is in the retracted position.

9. The bale handling apparatus as set forth in claim 7, further comprising:
   a second boom having a free end and another end pivotally connected proximate to a second end of the elongated frame;
   at least one tine connected to the second boom and extending transverse to a body of the second boom; and
   a second actuator operable to move the second boom between a retracted position, wherein the body and the free end of the second boom are juxtaposed relative to the elongated frame, and an extended position wherein the free end of the second boom extends beyond the second end of the frame, wherein in the retracted position the tine is substantially aligned with a rearward direction of travel and wherein in the extended position the tine is substantially aligned with the forward direction of travel.

10. The bale handling apparatus as set forth in claim 9, wherein the first and second actuators move the first and second booms simultaneously.

11. The bale handling apparatus as set forth in claim 7, further comprising:
   first and second tines connected to the first boom.

12. The bale handling apparatus of claim 11, wherein the first and second tines are substantially parallel and wherein the distance between the first and second tines is adjustable.

13. The bale handling apparatus as set forth in claim 7, further comprising a hitch frame fixedly connected to the elongated frame for removably attaching the bale handling apparatus to a three-point hitch, wherein the hitch frame includes at least one structure that extends vertically above a horizontal axis defined by the elongated frame.

14. The bale handling apparatus as set forth in claim 7, wherein said actuator is connectable to a hydraulic power source of a tractor.

15. The bale handling apparatus of claim 7, wherein said at least one tine is sized to engage first and second bales.

* * * * *

UNITED STATES PATENT AND TRADEMARK OFFICE
CERTIFICATE OF CORRECTION

| | | |
|---|---|---|
| PATENT NO. | : 7,963,734 B2 | Page 1 of 1 |
| APPLICATION NO. | : 12/537846 | |
| DATED | : June 21, 2011 | |
| INVENTOR(S) | : Bruha et al. | |

It is certified that error appears in the above-identified patent and that said Letters Patent is hereby corrected as shown below:

Column 9, line 14, please delete the word "is".

Signed and Sealed this
Thirteenth Day of September, 2011

David J. Kappos
*Director of the United States Patent and Trademark Office*